United States Patent [19]

Abe et al.

[11] Patent Number: 5,671,309

[45] Date of Patent: Sep. 23, 1997

[54] WIDE-BAND OPTICAL FIBER COUPLER AND METHOD FOR PREPARING THE SAME

[75] Inventors: Jun Abe; Masaaki Shirota; Kazuo Koya, all of Gunma, Japan

[73] Assignee: Shin-Etsu Chemical Co., Ltd., Tokyo, Japan

[21] Appl. No.: 495,932

[22] Filed: Jun. 28, 1995

[30] Foreign Application Priority Data

Jun. 29, 1994 [JP] Japan .................... 6-147303

[51] Int. Cl.$^6$ .................... G02B 6/26; G02B 6/42
[52] U.S. Cl. .................... 385/43; 385/9
[58] Field of Search .................... 385/9, 24, 31, 385/43, 46

[56] References Cited

U.S. PATENT DOCUMENTS

| | | | |
|---|---|---|---|
| 4,635,263 | 1/1987 | Mollenauer | 385/33 |
| 4,867,518 | 9/1989 | Stamnity et al. | 385/43 |
| 4,889,404 | 12/1989 | Bhagavetula et al. | 385/24 |
| 4,913,521 | 4/1990 | Tajima et al. | 385/126 |
| 5,046,804 | 9/1991 | Fukuma et al. | 385/43 |
| 5,074,631 | 12/1991 | Hamano et al. | 385/3 |
| 5,167,685 | 12/1992 | Fukuma et al. | 385/96 |
| 5,259,048 | 11/1993 | Ozeki | 385/31 |
| 5,359,449 | 10/1994 | Nishimoto et al. | 385/9 |
| 5,414,548 | 5/1995 | Tachikawa et al. | 385/24 |
| 5,438,444 | 8/1995 | Tayonaka et al. | 385/24 |

*Primary Examiner*—Rodney B. Bovernick
*Assistant Examiner*—Robert E. Wise
*Attorney, Agent, or Firm*—McAulay Fisher Nissen Goldberg & Kiel, LLP

[57] ABSTRACT

The object of the present invention is to provide a wide-band optical fiber coupler whose light-branching ratio is independent of the wavelength of light rays to be transmitted therethrough as well as a method for preparing the wide-band optical fiber coupler. When an optical fiber 1 having zero-dispersion at 1.55 μm band and an optical fiber 2 having zero-dispersion at 1.3 μm band are fused and drawn to form a coupled portion 3, a light beam 15 is incident upon the optical fiber 2 and the intensity of the light beam outgoing through either of these optical fibers 2 or 1 is measured to detect the light-branching ratio observed at the coupled portion 3. The drawing operation is interrupted at an instance when the detected light-branching ratio falls within the range of 50±5%.

5 Claims, 4 Drawing Sheets

Dispersion Shift of 1.55μm Band

Dispersion Shift of 1.3μm Band

WIDE-BAND OPTICAL FIBER COUPLER AND METHOD FOR PREPARING THE SAME

BACKGROUND OF THE INVENTION

The present invention relates to an optical fiber coupler having light-coupling and light-coupling-branching functions and, in particular, to a wide-band optical fiber coupler whose light-branching ratio shows low wavelength-dependency as well as a method for preparing the optical fiber coupler.

The optical fiber coupler is a device to be incorporated into an optical fiber communication system and serves to couple or branch light signals, or serves to couple or branch light signals having different wavelengths. In the field of the optical fiber communication system, in particular, such a system which makes use of the so-called wavelength division multiplex-transmission system for transmitting a plurality of light signals having different wavelengths through a single transmission line, there has been desired for the development of, in particular, a wide-band optical fiber coupler (WIC) whose light-branching ratio shows low wavelength-dependency.

As a means for preparing WIC, there have been known methods which comprises the steps of processing, in advance, only one of a plurality of optical fibers having the same specifications to change the propagation coefficient thereof, fusing it with the other unprocessed optical fibers and then drawing the fused optical fibers. For instance, Japanese Patent Provisional Publication No. 2-236507 discloses a method for preparing WIC by fusing and drawing an optical fiber which has been subjected to etching and an unprocessed optical fiber. Japanese Patent Provisional Publication No. 1-211704 discloses a method for preparing WIC by drawing, in advance, one of optical fibers (pre-drawing) and then fusing and drawing it together with the other unprocessed optical fiber. However, such a step for processing one of optical fibers such as an etching or pre-drawing process requires a long period of time and demands skill in the operation. For this reason, the conventional methods have failed to efficiently produce WIC's.

Moreover, Japanese Patent Provisional Publication Nos. 2-73205 and 2-125207 disclose methods for preparing WIC's by fusing and drawing a plurality of optical fibers whose specific refractive index differences, Δn, between the core and the clad differ from one another without subjecting the optical fibers to any preliminary processing. However, the optical fiber couplers produced by these methods often have light-branching ratios showing wavelength-dependency. The foregoing patents refer to the specific refractive index differences, Δn, but do not refer to the combination of optical fibers per se. Therefore, there has long been desired for the development of a method for easily preparing an optical fiber coupler whose light-branching ratio is free of wavelength-dependency.

SUMMARY OF THE INVENTION

The present invention has been developed to solve the foregoing problems associated with the conventional techniques and accordingly, an object of the present invention is to provide a wide-band optical fiber coupler whose light-branching ratio does not show any wavelength-dependency as well as a method for easily preparing such a wide-band optical fiber coupler.

Figure 1:
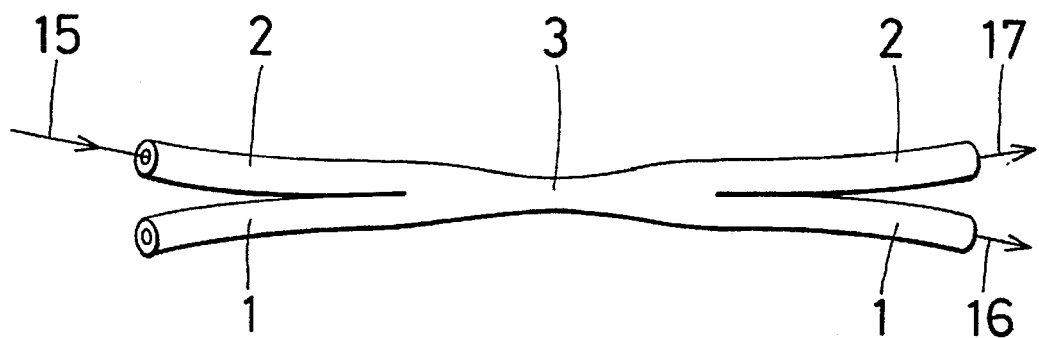
FIG. 1 is a schematic diagram of a wide-band optical fiber coupler according to the present invention.

The wide-band optical fiber coupler developed for accomplishing the foregoing objects comprises, as shown in FIG. 1, a plurality of optical fibers 1, 2 which are fused and drawn to form a coupled portion 3 and more specifically, the coupler comprises an optical fiber 1 having zero-dispersion at 1.55 μm band and an optical fiber 2 having zero-dispersion at 1.3 μm band which are fused together and drawn to form a coupled portion 3.

The optical fiber having zero-dispersion at 1.55 μm band has a structure which comprises a first core, a second core having a refractive index smaller than that of the first core and concentrically surrounding the first core and a clad layer which surrounds the second core and has a refractive index smaller than that of the second core. In the optical fiber 1, a specific refractive index difference, $\Delta n_1$, between the first core and the clad layer ranges from 0.70 to 1.00 and a specific refractive index difference, $\Delta n_2$, between the second core and the clad layer ranges from 0.07 to 0.12. Moreover, in the optical fiber 2 having zero-dispersion at 1.3 μm band, a specific refractive index difference, Δn, between the core and the clad layer ranges from 0.25 to 0.40.

Figure 2:
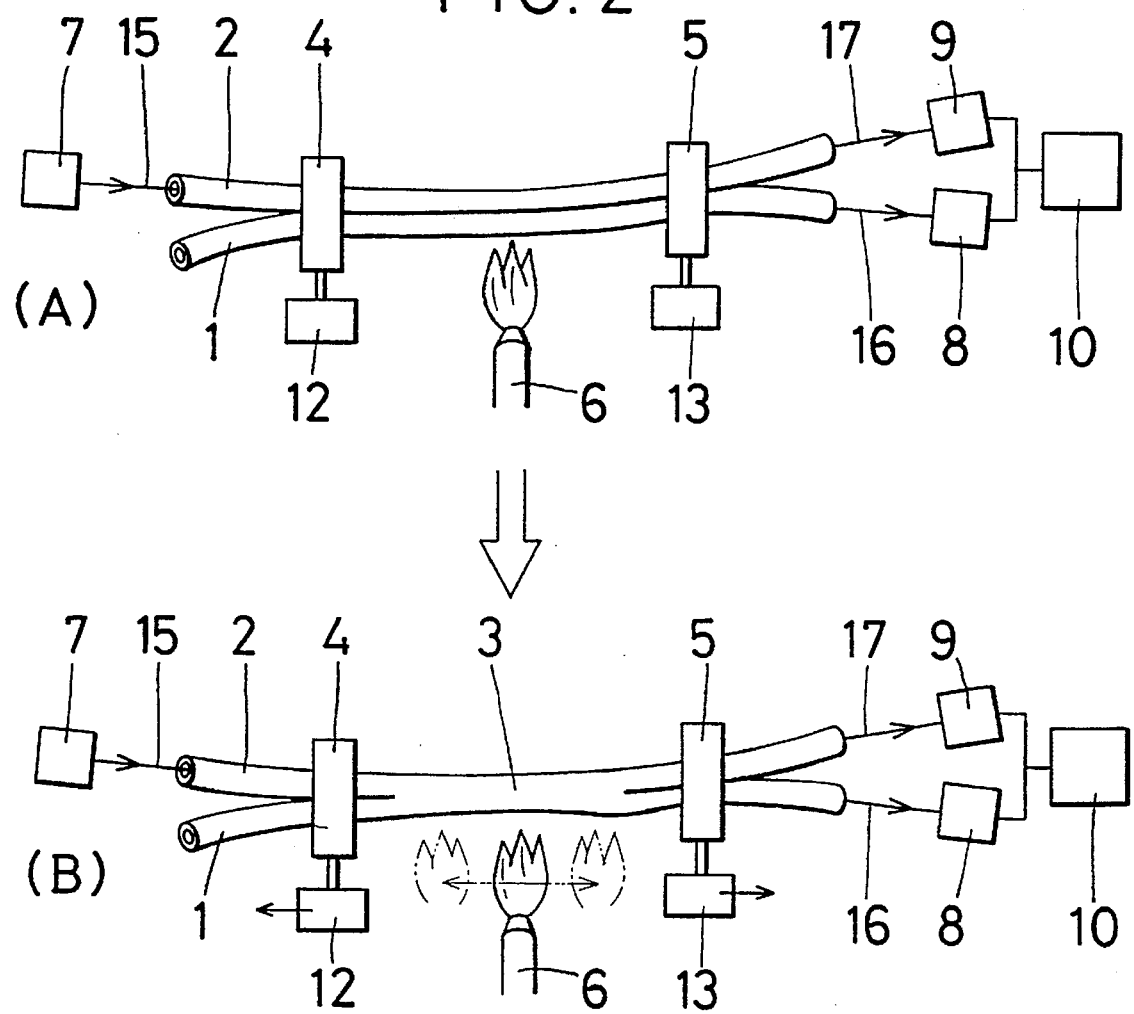
FIG. 2 is a schematic diagram for explaining an embodiment of the method for preparing a wide-band optical fiber coupler according to the present invention.

The method for preparing a wide-band optical fiber coupler comprises, as shown in FIG. 2, the steps of arranging a plurality of optical fibers 1, 2 parallel, drawing, with heating, a portion of the optical fibers arranged parallel while holding positions before and behind the portion to be drawn to fuse them and to thus form a coupled portion 3. When forming the coupled portion 3 by arranging, parallel, the optical fiber i having zero-dispersion at 1.55 μm band and the optical fiber 2 having zero-dispersion at 1.3 μm band, then fusing and drawing these optical fibers 1, 2, the optical fibers 1, 2 are drawn while a light beam having a wavelength to be transmitted therethrough is incident upon one of the optical fibers 1 or 2 and the quantity of the light beam 16, 17 outgoing through either of these optical fibers is measured to determine any change in the branching ratio observed at the coupled portion 3 and the drawing is interrupted at an instance when the light-branching ratio which varies depending on the drawing length of the fibers falls within the range of 50±5%.

DETAILED EXPLANATION OF THE INVENTION

Figure 7:
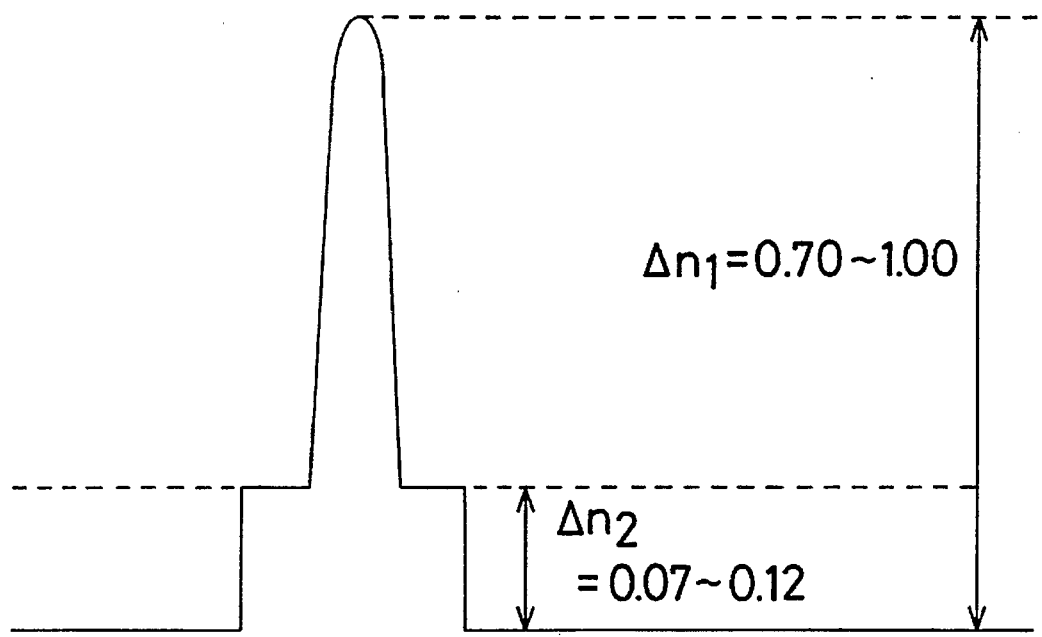
FIG. 7 is a diagram showing the refractive index distribution observed for an optical fiber having zero-dispersion at 1.55 μm band.

The wide-band optical fiber coupler according to the present invention is obtained by fusing and drawing an optical fiber 1 having zero-dispersion at 1.55 µm band and an optical fiber 2 having zero-dispersion at 1.3 µm band. The optical fiber 1 having zero-dispersion at 1.55 µm band has a refractive index distribution as shown in FIG. 7 and has a structure whose $\Delta n_1$ ranges from 0.70 to 1.00 and $\Delta n_2$ ranges from 0.07 to 0.12.

Figure 8:
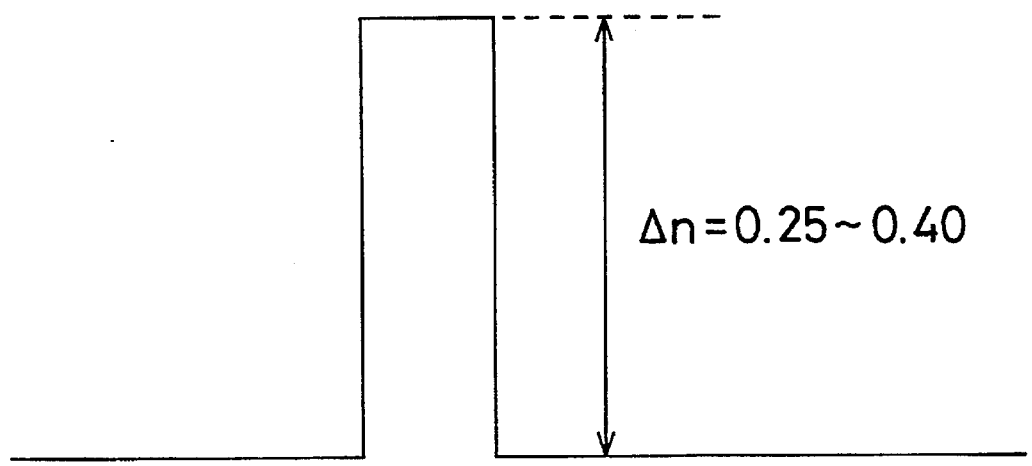
FIG. 8 is a diagram showing the refractive index distribution observed for an optical fiber having zero-dispersion at 1.3 μm band.

On the other hand, the optical fiber 2 having zero-dispersion at 1.3 µm band has a refractive index distribution as shown in FIG. 8 and has a structure whose $\Delta n$ ranges from 0.25 to 0.40. A light beam 15 incident upon the optical fiber 2 is branched, during passing through the coupled portion 3, into outgoing light beams 16, 17 which are transmitted through the optical fibers 1 and 2 respectively. The incident light beam 15 is branched in the coupled portion 3 without being distorted and the quantities of the outgoing light beams 16 and 17 are identical to one another, since the coupled portion 3 is formed by fusing and drawing the optical fiber i having zero-dispersion at 1.55 µm band and the optical fiber 2 having zero-dispersion at 1.3 µm band.

Working examples of the present invention, by which claims are not limited, will be described in more detail below.

FIG. 1 is a diagram schematically illustrating a wide-band optical fiber coupler according to the present invention. As seen from FIG. 1, the wide-band optical fiber coupler comprises an optical fiber 1 having zero-dispersion at 1.55 µm band and an optical fiber 2 having zero-dispersion at 1.3 µm band which are bonded together at a coupled portion 3. The optical fiber 1 is a dispersion shift fiber (DSF) having a structure such that the $\Delta n_1$ thereof is 0.867% and the $\Delta n_2$ is 0.083%. On the other hand, the optical fiber 2 is a single mode fiber (SMF) having such a structure that the $\Delta n$ thereof is 0.33%.

The incident light 15 is incident upon the edge on the incident side of the single mode fiber 2 and branched into two light beams each of which has an intensity equal to 50% of that of the incident light beam 15. The branched light beams each outgoes through the optical fiber 1 or 2 respectively as an outgoing light beam 16, 17.

FIG. 2 is a schematic diagram for explaining an embodiment of the method for preparing a wide-band optical fiber coupler according to the present invention. As shown in FIG. 2(A), an optical fiber bundle is formed by arranging a dispersion shift fiber 1 having zero-dispersion at 1.55 µm band and a single mode fiber 2 having zero-dispersion at 1.3 µm band. The foregoing optical fiber bundle is secured by clamping the front and rear portions thereof with clamps 4 and 5. The clamp 4 is connected to a clamp-moving stand 12, while the clamp 5 is connected to a clamp-moving stand 13. A gas burner 6 is positioned below the optical fiber bundle existing between the clamps 4 and 5. A light source 7 is connected to the edge of the single mode fiber 2 on the light-incident side so that a light beam 15 emitted from the light source 7 can be incident upon the single mode fiber 2. Photoreceptors 8 and 9 are connected to the edges of the dispersion shift fiber 1 and the single mode fiber 2 on the light-outgoing sides respectively so that the quantities of the light beams 16 and 17 outgoing through these edges can be detected, while a monitor 10 is connected to the photoreceptors 8 and 9 so that the light-branching ratio can be determined.

As shown in FIG. 2(B), the gas burner 6 is put into reciprocating motion while the light beam 15 of 1.55 µm having a wavelength emitted from the light source 7 is incident upon the single mode fiber 2 to thus heat the central portion of the fiber bundle comprising the optical fibers 1 and 2 arranged parallel. At the same time, the dispersion shift fiber 1 and the single mode fiber 2 are outwardly drawn by moving the clamps 4 and 5 in the direction opposite to one another through the operation of the clamp-moving stands 12 and 13 to form a coupled portion 3 and to thus give an optical fiber coupler. The quantities of light beams 16, 17 outgoing through the fibers 1 and 2 are detected by the photoreceptors 8 and 9 during the production of the coupler. The detected quantities of the light beams are integrated by the monitor 10 to thus determine the light-branching ratios. The drawing operation is interrupted at an instance when the light-branching ratio reaches 50±5% to thus finish the production of an optical fiber coupler.

Figure 3:
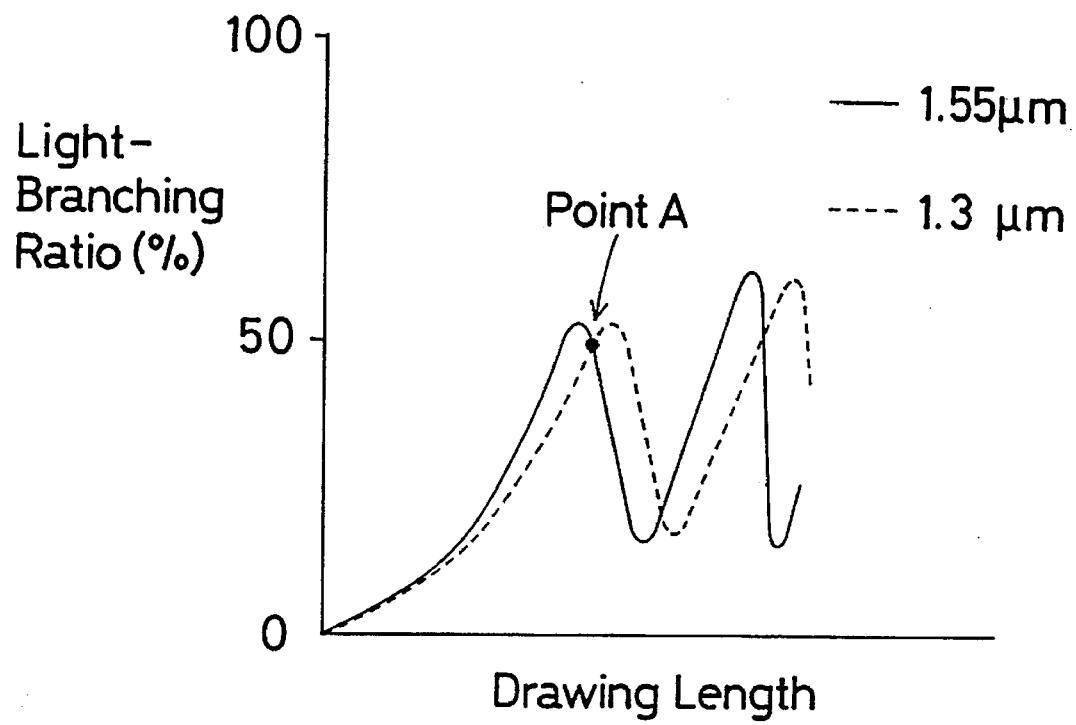
FIG. 3 is a diagram showing the relation between the drawing length and the branching ratio of the wide-band optical fiber coupler according to the present invention.

FIG. 3 is a diagram showing the relation between the drawing length of the optical fiber bundle and the light-branching ratio observed when an optical fiber coupler is prepared from a dispersion shift fiber 1 having zero-dispersion at 1.55 µm band and a single mode fiber 2 having zero-dispersion at 1.3 µm band in the same manner used in the foregoing embodiment. In this figure, the light-branching ratio means the rate of the quantity of the light beam outgoing through the dispersion shift fiber 1 relative to the sum of the quantity of the light beams outgoing through the dispersion shift fiber 1 and the single mode fiber 2 respectively. These two optical fibers differ from one another in the propagation coefficient and therefore, the light having a long wavelength, i.e., the light having a wavelength of 1.55 µm can propagate through the fibers faster than the propagation speed of the light having a short wavelength, i.e., the light having a wavelength of 1.3 µm as seen from FIG. 3. The drawing of the fibers is interrupted at an instance (point A) when the light-branching ratio reaches 50±5% and thus the intended wide-band optical fiber coupler can be obtained.

Figure 4:
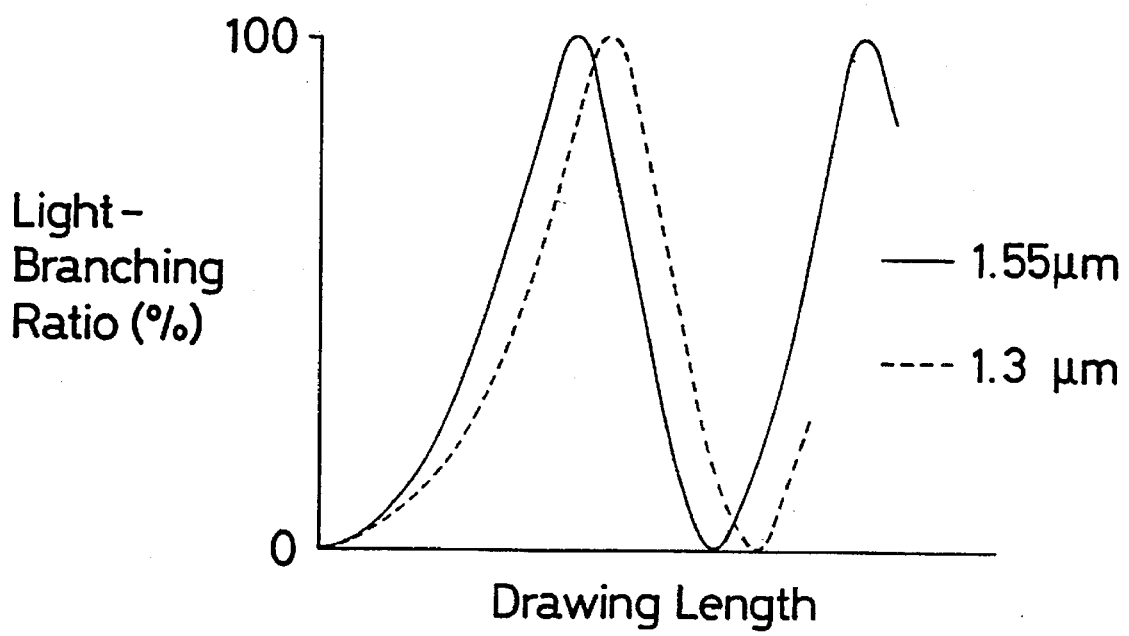
FIG. 4 is a diagram showing the relation between the drawing length and the branching ratio of the wide-band optical fiber coupler prepared from two identical single mode fibers.

When an optical fiber coupler is prepared using two identical single mode fibers, the relation between the drawing length of the optical fiber bundle and the branching ratio as shown in FIG. 4 is observed.

Figure 5:
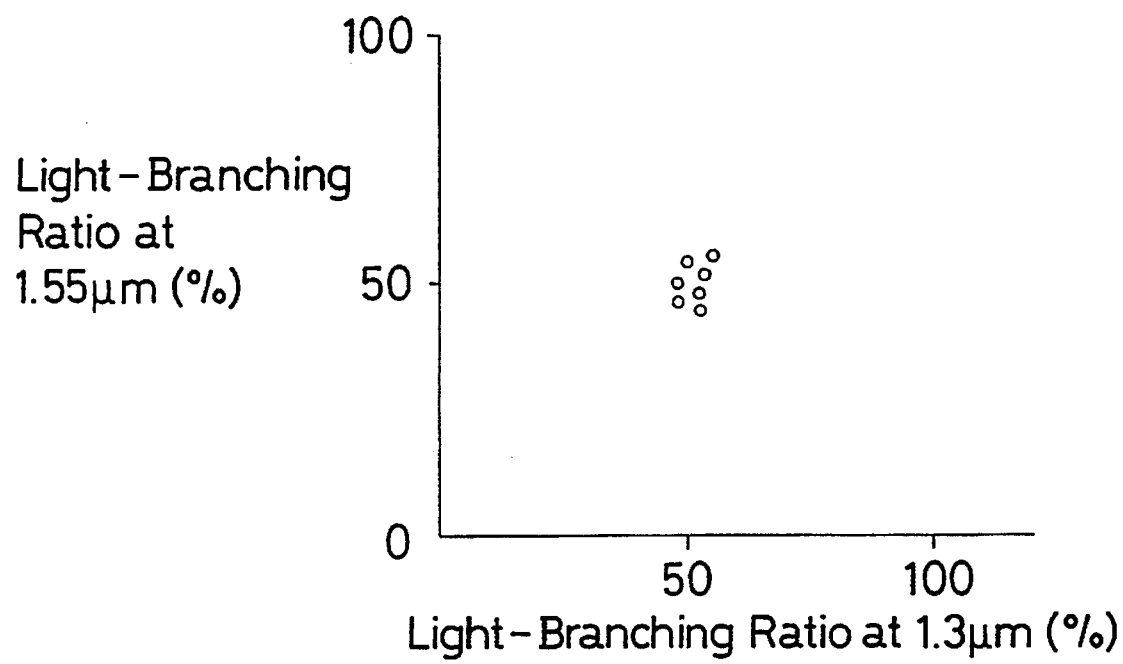
FIG. 5 is a diagram showing the distribution of the light-branching ratios for the wide-band optical fiber coupler according to the present invention which are observed at a plurality of wavelength bands.

FIG. 5 is a diagram showing the distribution of the light-branching ratios observed for an optical fiber coupler prepared from a dispersion shift fiber 1 having zero-dispersion at 1.55 µm band and a single mode fiber 2 having zero-dispersion at 1.3 µm band in the same manner used in the foregoing embodiment. Light beams each having a wavelength of 1.3 µm or 1.55 µm are separately incident upon the single mode fiber 2 to determine the light-branching ratios observed at these wavelengths. The resulting dispersion of the light-branching ratio is shown in FIG. 5. Both of these light-branching ratios for the wavelengths of 1.3 µm and 1.55 µm fell within the foregoing range, i.e., 50±5%. This fact clearly indicates that the optical fiber coupler thus prepared is a wide-band optical fiber coupler independent of the wavelengths of light beams to be transmitted therethrough.

Figure 6:
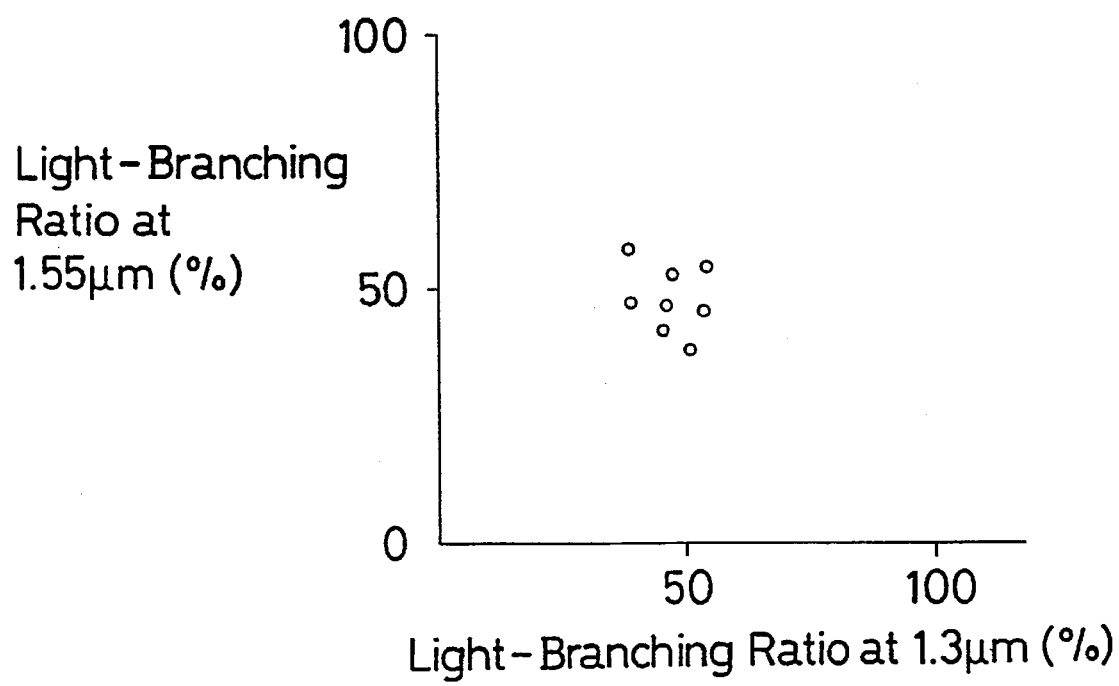
FIG. 6 is a diagram showing the distribution of the light-branching ratios for an optical fiber coupler prepared from an optical fiber whose diameter has been reduced in advance and an optical fiber which is not subjected to such a treatment, observed at a plurality of wavelength bands.

FIG. 6 is a diagram showing the distribution of the light-branching ratios observed for an optical fiber coupler prepared from an optical fiber whose diameter has been reduced in advance and an optical fiber which is not subjected to such a treatment, in the same manner used in the foregoing embodiment. Light beams each having a wavelength of 1.3 µm or 1.55 µm are separately incident upon the optical fiber whose diameter is reduced to determine the light-branching ratios observed at these wavelengths. The resulting dispersion of the light-branching ratio is shown in FIG. 6. The results indicate that the distribution of the light-branching ratios observed at the wavelengths of 1.3 μm and 1.55 μm became wide.

As has been discussed above in detail, the wide-band optical fiber coupler of the present invention is prepared while omitting the step for reducing the diameter of the starting optical fiber. The omission of the diameter-reducing step which demands skill in the practice thereof and in which there is a greater possibility to be unsuccessful permits the easy production of such a wide-band optical fiber coupler and the improvement in the production yield thereof.

What is claimed is:

1. A wide-band optical fiber coupler having a coupled portion formed by fusing and drawing a plurality of optical fibers wherein an optical fiber having zero-dispersion at 1.55 μm band and an optical fiber having zero-dispersion at 1.3 μm band are fused together and drawn to form a coupled portion wherein the optical fiber having zero-dispersion at 1.55 μm band has a structure which comprises a first core, a second core having a refractive index smaller than that of the first core and concentrically surrounding the first core and a clad layer which surrounds the second core and has a refractive index smaller than that of the second core and wherein the specific refractive index difference, $\Delta n_1$, between the first core and the clad layer ranges from 0.70 to 1.00, and the specific refractive index difference, $\Delta n_2$, between the second core and the clad layer ranges from 0.07 to 0.12 and the specific refractive index difference, $\Delta n$, between the core and the clad layer of the optical fiber having zero-dispersion at 1.3 μm band ranges from 0.25 to 0.40.

2. A method for preparing a wide-band optical fiber coupler which comprises the steps of arranging a plurality of optical fibers parallel, drawing, with heating, a portion of the optical fibers arranged parallel while holding positions before and behind the portion to be drawn to fuse them and to thus form a coupled portion, wherein when an optical fiber having zero-dispersion at 1.55 μm band and an optical fiber having zero-dispersion at 1.3 μm band are arranged parallel, then fused together and drawn to form a coupled portion, the optical fibers are drawn while a light beam having a wavelength to be transmitted therethrough is incident upon one of the optical fibers and the quantity of the light beam outgoing through either of these optical fibers is measured to determine any change in the light-branching ratio observed at the coupled portion and the drawing is interrupted at an instance when the light-branching ratio which varies depending on the drawing length of the fibers falls within the range of 50±5%.

3. The method for preparing a wide-band optical fiber coupler according to claim 2 wherein the optical fiber having zero-dispersion at 1.55 μm band has a structure which comprises a first core, a second core having a refractive index smaller than that of the first core and concentrically surrounding the first core and a clad layer which surrounds the second core and has a refractive index smaller than that of the second core, a specific refractive index difference, $\Delta n_1$, between the first core and the clad layer ranges from 0.70 to 1.00, a specific refractive index difference, $\Delta n_2$, between the second core and the clad layer ranges from 0.07 to 0.12 and a specific refractive index difference, $\Delta n$, between the core and the clad layer of the optical fiber having zero-dispersion at 1.3 μm band ranges from 0.25 to 0.40.

4. A wide-band optical fiber coupler having a coupled portion formed by fusing and drawing a plurality of optical fibers wherein an optical fiber having zero-dispersion at 1.55 μm band which comprises a first core, a second core having a refractive index smaller than that of the first core and concentrically surrounding the first core and a clad layer which surrounds the second core and has a refractive index smaller than that of the second core, and an optical fiber having zero-dispersion at 1.3 μm band comprising a core and a clad layer, are fused together and drawn to form a coupled portion.

5. The wide-band optical fiber coupler according to claim 4 wherein the optical fiber comprising the first core, the second core and the clad layer has a specific refractive index different, $\Delta n_1$, between the first core and the clad layer ranging from 0.70 to 1.00, a specific refractive index difference, $\Delta n_2$, between the second core and the clad layer ranging from 0.07 to 0.12 and the optical fiber comprising the core and the clad layer has a specific refractive index difference, $\Delta n$, between the core and the clad layer ranging from 0.25 to 0.40.

* * * * *